Dec. 8, 1931.  A. POWELL  1,835,721
PERMANENT MAGNET MAGNETIC MOTOR
Filed Dec. 5, 1929  2 Sheets-Sheet 1
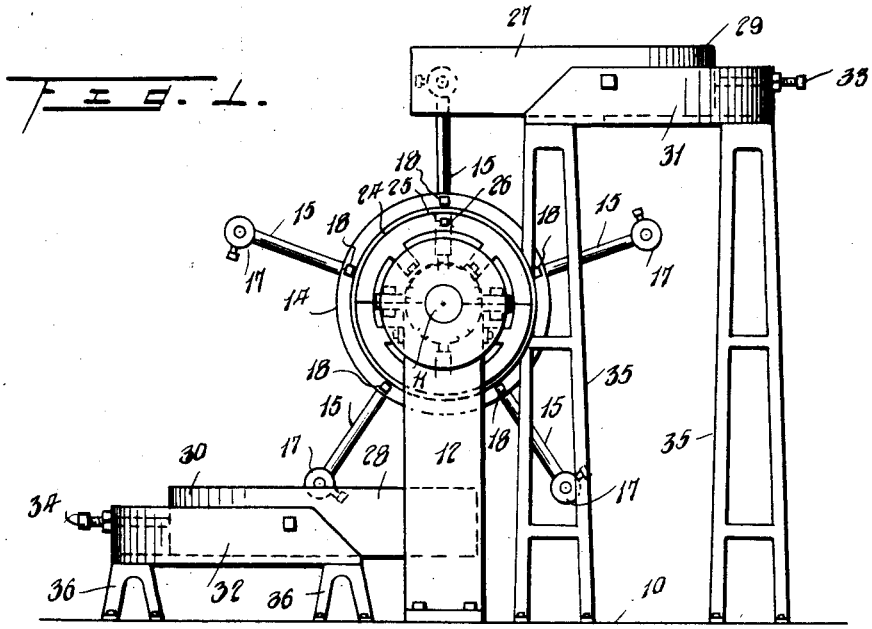
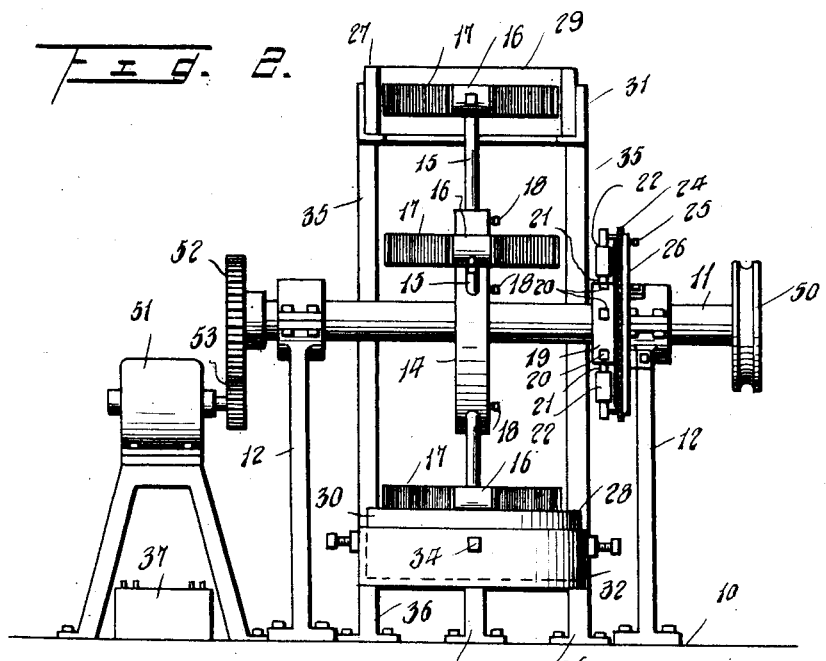
Inventor
Arthur Powell.
By L. F. Randolph Jr.
Attorney

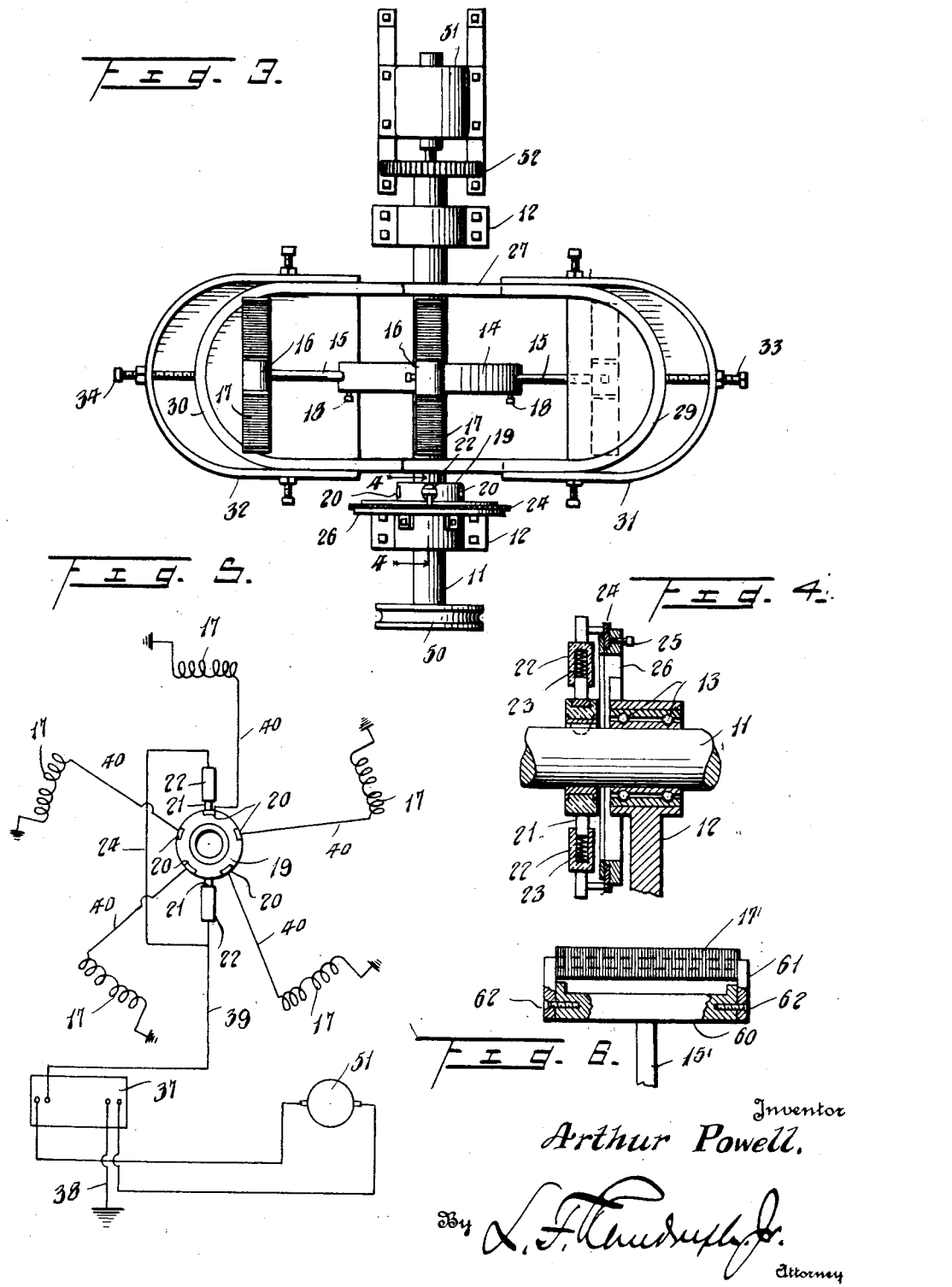

Patented Dec. 8, 1931

1,835,721

UNITED STATES PATENT OFFICE

ARTHUR POWELL, OF DRUMRIGHT, OKLAHOMA, ASSIGNOR OF ONE-HALF TO JAMES W. HONEY, OF DRUMRIGHT, OKLAHOMA

PERMANENT MAGNET MAGNETIC MOTOR

Application filed December 5, 1929. Serial No. 411,862.

This invention relates to a magnetic motor and it aims to provide an exceedingly inexpensive magnetic motor from the standpoint of cost of operation as well as manufacture. A particular object toward the end stated is to provide a motor wherein the field is provided by permanent magnetic means.

A further object is to provide a novel construction wherein the rotor has arms terminally provided with solenoids that when deenergized the cores provide armatures that are attracted by the permanent magnets, and are so wound that when energized the poles of the solenoids or electro-magnets are identical with the poles of the permanent magnets and continuation of rotation of the rotor is the result.

Various additional objects and advantages will become apparent from a consideration of the description following taken in connection with accompanying drawings illustrating an operative embodiment.

In said drawings:—

Figure 1 is a view of the motor in side elevation,

Figure 2 is an end view thereof looking from the left in Figure 1,

Figure 3 is a plan view of the motor,

Figure 4 is a cross sectional view taken on the line 4—4 of Figure 3,

Figure 5 is an electrical diagram of the different parts, and

Figure 6 is a fragmentary detail of a modified form of means for mounting the solenoids on the rotor arms.

Referring specifically to the drawings, the various parts constituting the motor are supported on a conventional base or the like as at 10.

The rotor of the motor may consist of a shaft 11 which is horizontally disposed and journaled in suitable bearings 12 rising from the base 10. In the bearings 12 ball bearings or friction reducing means 13 are interposed so that the shaft 11 may turn freely and with as little resistance as practical. On the shaft 11 a rotor disk 14 is fixed which has any suitable number of equi-distantly spaced arms 15 radiating therefrom, the outer ends of which are fastened to collars or the like 16 carried by horizontally disposed solenoids or electro-magnets 17 of any desired type. The arms 15 are preferably removably disposed in sockets in the disk 14 and held against displacement by screws 18. The shaft 11 also carries a suitable commutator which may consist of an annular body 19 provided with conducting segments 20 insulated from each other and corresponding in number to the electro-magnets 17. The segments 20 are wiped by diametrically opposed brushes 21 slidably mounted in holders 22 urged toward the commutator segments by expansive springs 23 in the holders. The holders 22 of course do not turn but are rigid with a conductor ring 24 removably clamped or otherwise fastened as at 25 to a mounting ring or device 26 for instance forming part of or connected to one of the bearings 12.

The solenoids 17 are adapted to be moved between legs 27 and 28, respectively, of upper and lower horseshoe or permanent magnets 29 and 30. Such magnets 29 and 30 are supported horizontally and one hundred and eighty degrees apart, and in any desired way from the base or support 10. For instance, such magnets may rest in brackets 31 and 32, respectively, being adjustably positioned and rigidly clamped by means of screws 33 and 34, respectively. The bracket or holder 31 is mounted at the proper height by skeleton supports or legs 35 and the holder 32 is mounted from the support 10 by skeleton legs or brackets 36, considerably shorter than those at 35.

The power necessary for operating the motor is taken from any suitable battery for instance an ordinary dry cell battery of two volts or less as suggested at 37, one terminal 38 thereof being grounded and a conductor 39 extending from the other terminal to the ring 24 and thus to the brushes 21. Each segment or contact 20 is connected by a conductor 40 to the winding of a separate solenoid 17, such winding being grounded to the base or frame of the motor, as shown.

The operation of the commutator is so timed that while a solenoid is approaching one of the magnets 29 or 30 it is deenergized and the core of the solenoid is an armature attracted by the magnet and the solenoid is then energized and being wound so that the poles of the solenoid are the same as the poles of the magnet the solenoid is repelled by the magnet to provide for continued rotation of the rotor.

The power from the motor may be taken off in any desired manner and applied to any work preferred and for instance from a pulley 50 keyed to the shaft 11, such pulley for instance being adapted to drive a grinding machine or other work. It may also if desired, be used to operate an electric generator as suggested at 51, the latter being geared to the shaft 11 through spur gears 52 and 53, respectively. The current generated may be supplied through suitable lead wires from the generator 51 to any source of use.

Various changes may be resorted to provided they fall within the spirit and scope of the invention. For instance, any suitable means may be used to secure the solenoids to the arms. For instance, a modified form is shown in Figure 6 where the equivalent of one of the arms 15 is shown at 15' and the equivalent of the solenoids 17 is shown at 17'. Such arm 15' has a cross head 60 and the solenoid has depending lugs 61 which are screwed as at 62 to the cross head.

It will be realized that the motor will operate as long as the permanent magnets 29 and 30 retain their magnetism and that such magnets may be removed in order to be remagnetized when desired.

I claim as my invention:—

1. A magnetic motor comprising spaced bearings, a shaft journaled in said bearings, a ring carried by one of said bearings, a commutator on said shaft, brushes carried by the ring and coacting with the commutator, a rotor on the shaft spaced from the ring and located between the bearings, substantially T-shaped arms extending from the rotor having horizontally disposed solenoids at their outer ends, permanent magnets arranged one hundred and eighty degrees apart with their open ends innermost and mainly on opposite sides of the axis of said shaft, said solenoids being grounded, and said commutator being provided with spaced conducting segments each connected with a solenoid and arranged to alternately engage the brushes aforesaid so as to energize the solenoid with a polarity opposite to that of the permanent magnet upon registration therewith.

2. A magnetic motor comprising spaced bearings, a shaft journaled in said bearings, a ring carried by one of said bearings, a commutator on said shaft, brushes carried by the ring and coacting with the commutator, a rotor on the shaft spaced from the ring and located between the bearings, substantially T-shaped arms extending from the rotor having horizontally disposed solenoids at their outer ends, permanent magnets arranged one hundred and eighty degrees apart with their open ends innermost and mainly on opposite sides of the axis of said shaft, said solenoids being grounded, holder elements engaging said magnets and being horizontally disposed, legs supporting said holder elements, and said commutator being provided with spaced conducting segments each connected with a solenoid and arranged to alternately engage the brushes aforesaid so as to energize the solenoid with a polarity opposite to that of the permanent magnet upon registration therewith.

In testimony whereof I affix my signature.

ARTHUR POWELL.